(12) United States Patent
Buhler

(10) Patent No.: US 12,483,572 B2
(45) Date of Patent: Nov. 25, 2025

(54) CONFIGURATIONS FOR SECURE USE OF CLOUD TECHNOLOGY

(71) Applicants: Sony Group Corporation, Tokyo (JP); Sony Pictures Entertainment Inc., Culver City, CA (US)

(72) Inventor: Justin Buhler, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 273 days.

(21) Appl. No.: 18/087,442

(22) Filed: Dec. 22, 2022

(65) Prior Publication Data

US 2023/0199012 A1  Jun. 22, 2023

Related U.S. Application Data

(60) Provisional application No. 63/265,885, filed on Dec. 22, 2021.

(51) Int. Cl.
*H04L 29/06* (2006.01)
*H04L 9/40* (2022.01)

(52) U.S. Cl.
CPC ........ *H04L 63/1425* (2013.01); *H04L 63/105* (2013.01); *H04L 63/1433* (2013.01)

(58) Field of Classification Search
CPC ............... H04L 63/1425; H04L 63/105; H04L 63/1433
See application file for complete search history.

(56) References Cited

U.S. PATENT DOCUMENTS

| | | | |
|---|---|---|---|
| 10,514,905 B1 * | 12/2019 | Montgomery | G06F 21/54 |
| 10,911,564 B1 * | 2/2021 | Sarukkai | H04L 67/306 |
| 2021/0099478 A1 * | 4/2021 | Seetharamaiah | H04L 63/1433 |

* cited by examiner

*Primary Examiner* — Evans Desrosiers
(74) *Attorney, Agent, or Firm* — Procopio, Cory, Hargreaves & Savitch LLP

(57) ABSTRACT

Providing secure use of a cloud technology within a cloud infrastructure, including: securing a root account by establishing governance processes of a cloud configuration; enabling audit logging to generate logs of the cloud configuration; enabling threat monitoring and cloud security posture management by procuring and implementing compliance product of the cloud configuration; and routing the logs of the cloud configuration to a managed security service provider.

14 Claims, 6 Drawing Sheets

CONFIGURATIONS FOR SECURE USE OF CLOUD TECHNOLOGY

CROSS-REFERENCE TO RELATED APPLICATIONS

This application claims the benefit of priority under 35 U.S.C. § 119(e) of U.S. Provisional Patent Application No. 63/265,885, filed Dec. 22, 2021, entitled "Configurations for Secure Use of Cloud Technology". The disclosure of the above-referenced application is incorporated herein by reference.

BACKGROUND

Field

The present disclosure relates to cloud technology, and more specifically, to configurations that provide secure use of the cloud technology.

Background

Cloud infrastructure deployments represent data center deployments and consist of hundreds of different configuration options. Misconfiguration of any of these configuration options can introduce vulnerabilities, which could result in cyber security events.

In some conventional systems or environments, this domain of vulnerabilities is not consistently managed. In other conventional systems, many of the cloud deployments used across the systems were deployed before applying a common plan. These deployments can run business critical applications and represent active unknown configuration vulnerability risks.

SUMMARY

The present disclosure provides for providing configurations for secure use of a cloud technology.

In one implementation, a method for providing secure use of a cloud technology within a cloud infrastructure is disclosed. The method includes securing a root account by establishing governance processes of a cloud configuration; enabling audit logging to generate logs of the cloud configuration; enabling threat monitoring and cloud security posture management by procuring and implementing compliance product of the cloud configuration; and routing the logs of the cloud configuration to a managed security service provider.

In another implementation, a system for providing secure use of a cloud technology within a cloud infrastructure includes a governance process manager, a control plane audit logger, a control plane threat monitor, a cloud security posture manager, and a log router. The governance process manager secures a root account by establishing governance processes of a cloud configuration. The control plane audit logger enables audit logging to generate logs of the cloud configuration. The control plane threat monitor enables threat monitoring. The cloud security posture manager manages cloud security posture by procuring and implementing compliance product of the cloud configuration. The log router routes the logs of the cloud configuration to a managed security service provider.

In yet another implementation, a non-transitory computer-readable storage medium storing a computer program to provide secure use of a cloud technology within a cloud infrastructure includes executable instructions that cause a computer to: secure a root account by establishing governance processes of a cloud configuration; enable audit logging to generate logs of the cloud configuration; enable threat monitoring and cloud security posture management by procuring and implementing compliance product of the cloud configuration; and route the logs of the cloud configuration to a managed security service provider.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, misconfigurations in the conventional cloud infrastructure may represent active unknown configuration vulnerability risks, which may result in cyber security events. In some systems, there may not be any standardized documentation or guidance on configuring cloud service provider platforms securely. The documentation available externally was specific to individual accounts and not specific to cloud deployments from an enterprise perspective. The result was cloud environments with insecure identity and access management implementations, inconsistent security configuration practices, and nearly zero auditability. Multiple systems may apply a common plan to technical security controls, improving interoperation across systems and businesses. However, as noted above, many of the cloud deployments used across the systems were deployed before applying the common plan. Accordingly, there is a need to introduce meaningful security improvements without impacting the running services, by introducing change.

To address the issues with the conventional cloud infrastructure, certain implementations of the present disclosure provide for apparatus and methods to implement techniques for configuration specifications supporting the secure use of cloud technology. One implementation consolidates configuration standards for securely configuring the environments that are enterprise-friendly and address the risks related to insecure identity and access management implementations, poor security configuration, and auditability.

In one implementation, multiple systems are configured to use common solutions for security and data management. Common configurations improve interoperability and data exchange. Various implementations also establish guidelines for configuration that can be applied and maintained across the systems.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1:
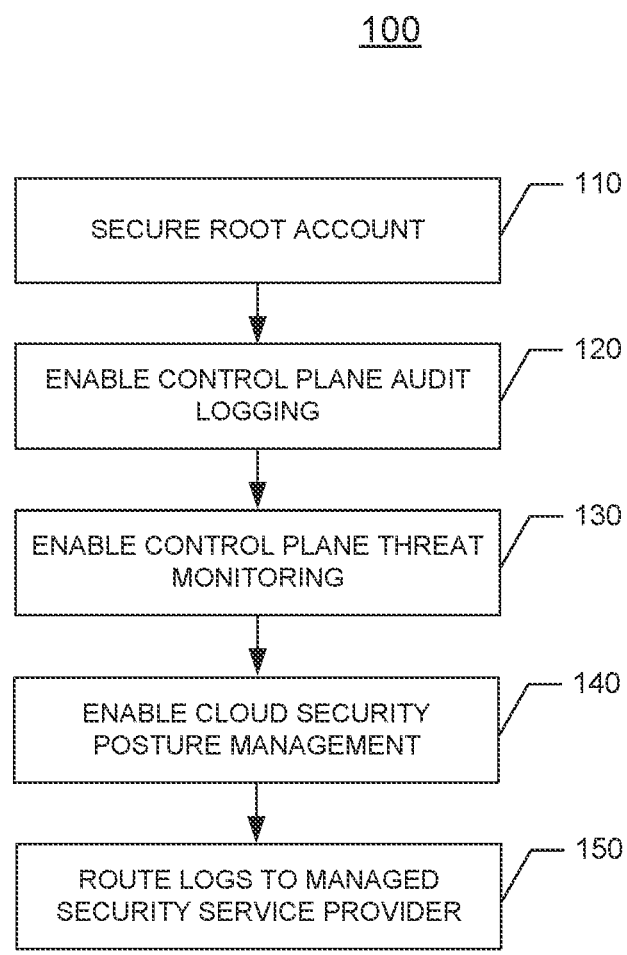
FIG. 1 is a flow diagram of a process for implementing configuration specifications supporting the secure use of cloud technology in accordance with one implementation of the present disclosure.

FIG. 1 is a flow diagram of a process 100 for implementing configuration specifications supporting the secure use of cloud technology in accordance with one implementation of the present disclosure. One implementation provides a migration plan for these legacy (i.e., pre-cloud action plan) environments to implement basic security on the account without disrupting the business applications.

In the illustrated implementation of FIG. 1, the root account is secured, at block 110, by establishing governance processes of a cloud configuration to facilitate the introduction of new cloud environments that are compliant with the framework of the cloud infrastructure. Once the governance processes for configuration specifications supporting the secure use of cloud technology have been established, at block 110, the control plane audit logging of the cloud configuration is enabled, at block 120, which formalizes an approach to logging and auditing within the cloud infrastructure. In the context of cloud services, the control plane refers to management and orchestration across an organization's cloud environment and provides configuration updates and determines which path to use. This is in contrast to the data plane which refers to forwarding or moving the data traffic or information from one place to another.

The migration plan then enables control plane threat monitoring, at block 130, and cloud security posture management, at block 140, by procuring and implementing compliance product of the cloud configuration, which provides real-time visibility into the existing risks of the cloud configuration that are active within the environment. Finally, the logs of the cloud configuration are routed to a managed security service provider, at block 150.

Accordingly, the migration plan recited above is focused on identifying tools and techniques for remediating immediate risks associated with existing deployment of cloud services. The goal is to provide a standardized approach to establish visibility, auditability, and governance of existing and new cloud platforms. Each block of the migration plan is described in detail in FIGS. 2A through 2C. Note that the steps and order of steps may vary or be performed in parallel in different implementations from those shown in the figures here.

In an alternative implementation, the process 100 for supporting the secure use of cloud technology also includes establishing cloud account inventory as follows: (1) establish centralized asset tracking in the cloud; (2) establish operating model to enable effective asset management; (3) establish the location for keeping cloud asset inventory; (4) generate a set of processes and tools to create and maintain an account/subscription inventory; (5) generate framework for tagging assets/services within an account; (6) generate code to automatically tag assets/services within an account; (7) generate code to automatically export assets lists by arbitrary criteria in JavaScript Object Notation (JSON) and comma-separated values (CSV) format; and (8) generate code to maintain account asset list in asset registry.

In a further implementation, the process 100 for supporting the secure use of cloud technology further includes implementing identity federation as follows: (1) establish requirements and work towards procurement; (2) generate a solution architecture and supporting processes, procedures, code, and training to federate the corporate identity with cloud users using state of the art authentication mechanism; (3) generate a solution architecture and supporting processes, procedures, code, and training for managing API keys and lifecycle; (4) generate break-glass procedure should connectivity be lost between Cloud and Identity provider; (5) generate the standard permission groups and roles required at cloud account creation; (6) configure cloud configuration compliance product to monitor identity and access management (IAM) configuration; (7) define logging and monitoring use cases; and (8) generate the code to implement federation, permission groups and roles within a cloud account.

In yet another implementation, the process 100 for supporting the secure use of cloud technology further includes generating incident response framework as follows: (1) work with the managed security service provider to establish and agree on playbooks for the management of incidents across the full incident lifecycle (e.g. preparation, detection and analysis, containment, eradication, recovery, and post-incident activity); (2) identify the services and third-party tools required to effectively support incident response procedures in the cloud; (3) generate the code required to configure roles and permissions required for incident response; (4) identify the training required for the information security response team; (5) configure cloud configuration compliance toolset to monitor for the presence of incident response configuration; (6) generate the code required to automatically contain an environment for incident triage; and (7) generate an initial plan for addressing chain of custody obligations.

Figure 2A:
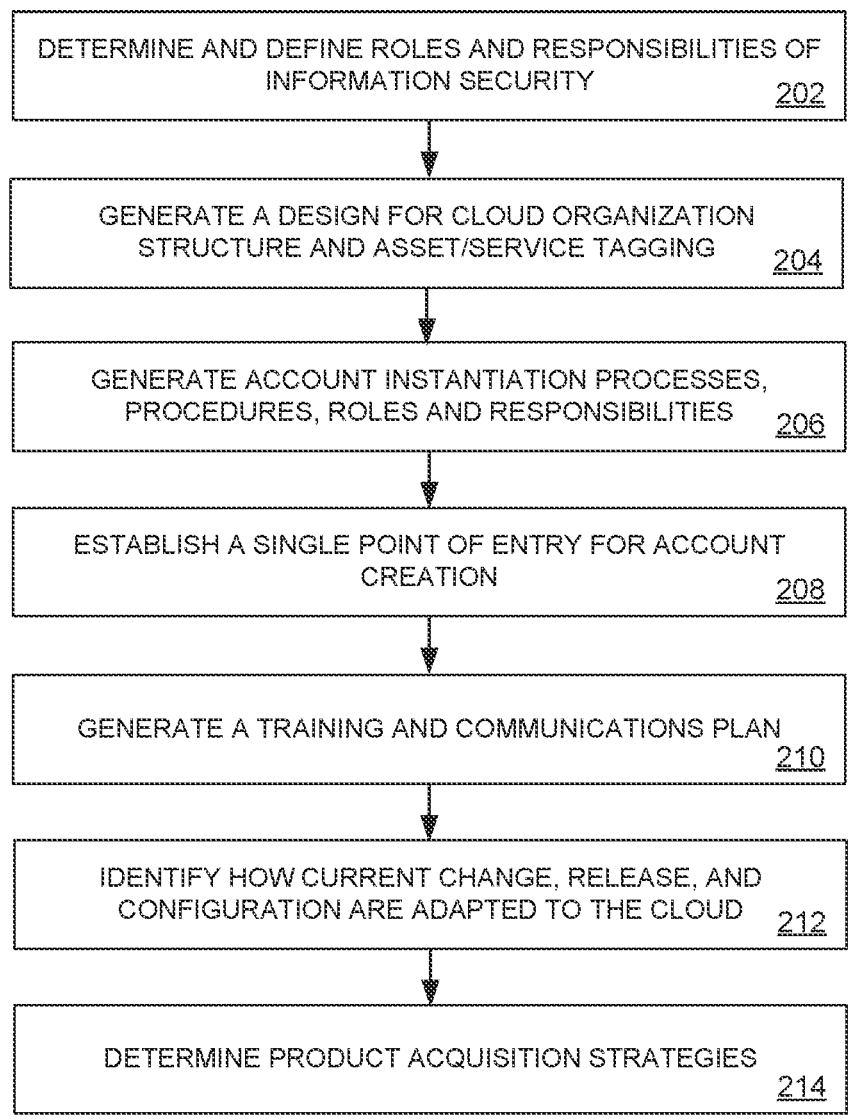
FIG. 2A is a detailed flow diagram of block for securing the root account in accordance with one implementation of the present disclosure.

FIG. 2A is a detailed flow diagram of block 110 for securing the root account in accordance with one implementation of the present disclosure. As described above, the root account is secured by establishing governance processes of the cloud configuration. This facilitates the introduction of new cloud environments that are compliant with the framework of the cloud infrastructure.

In the illustrated implementation of FIG. 2A, the roles and responsibilities of the information security within the working group of the cloud are determined and defined, at block 202, for billing and forecasting costs of cloud usage and associated requirements. A design for the organizational structure of the cloud and asset/service tagging is then generated, at block 204. Account instantiation processes, procedures, roles and responsibilities, code, and training for provisioning an account with the baseline configuration are generated, at block 206. For example, these may include account federation, logging, locked down root account, default identity and access management (IAM) administrator role with email distribution, and cloud configuration compliance.

A single point of entry for account creation is established, at block 208. Training and communications plans are then generated, at block 210, to educate on the cloud technology and the cloud information security standard. Further, identification/determination of how current change, release, configuration, risk, incident, and service management processes are adapted to the cloud is made, at block 212. Finally, product acquisition strategies are determined, at block 214. The acquisition strategies may include (1) when to select products which support multiple cloud providers versus a single cloud provider or (2) building a solution versus buying a commercial solution for a given problem.

Figure 2B:
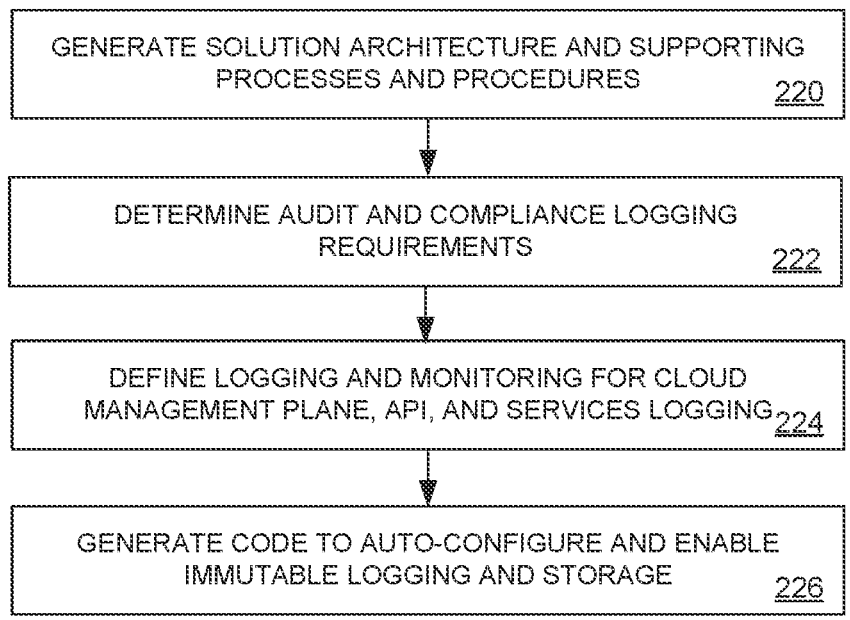
FIG. 2B is a detailed flow diagram of block for enabling control plane audit logging in accordance with one implementation of the present disclosure.

FIG. 2B is a detailed flow diagram of block 120 for enabling control plane audit logging in accordance with one implementation of the present disclosure. As described above, the control plane audit logging of the cloud configuration is enabled to formalize an approach to logging and auditing within the cloud infrastructure. This facilitates incident response functions and the managed security service provider (MSSP) to be able to accurately and rapidly identify issues within existing cloud environments.

In the illustrated implementation of FIG. 2B, solution architecture and supporting processes, procedures, code, and training for routing and delivering cloud logs to the MSSP are generated, at block 220. Audit and compliance logging requirements are determined, at block 222. Logging and monitoring are defined, at block 224, for cloud management plane, application program interfaces (APIs), and services logging (excluding operating system and application logging). Code to auto-configure and enable immutable logging and storage within a cloud account, is then generated, at block 226.

Figure 2C:
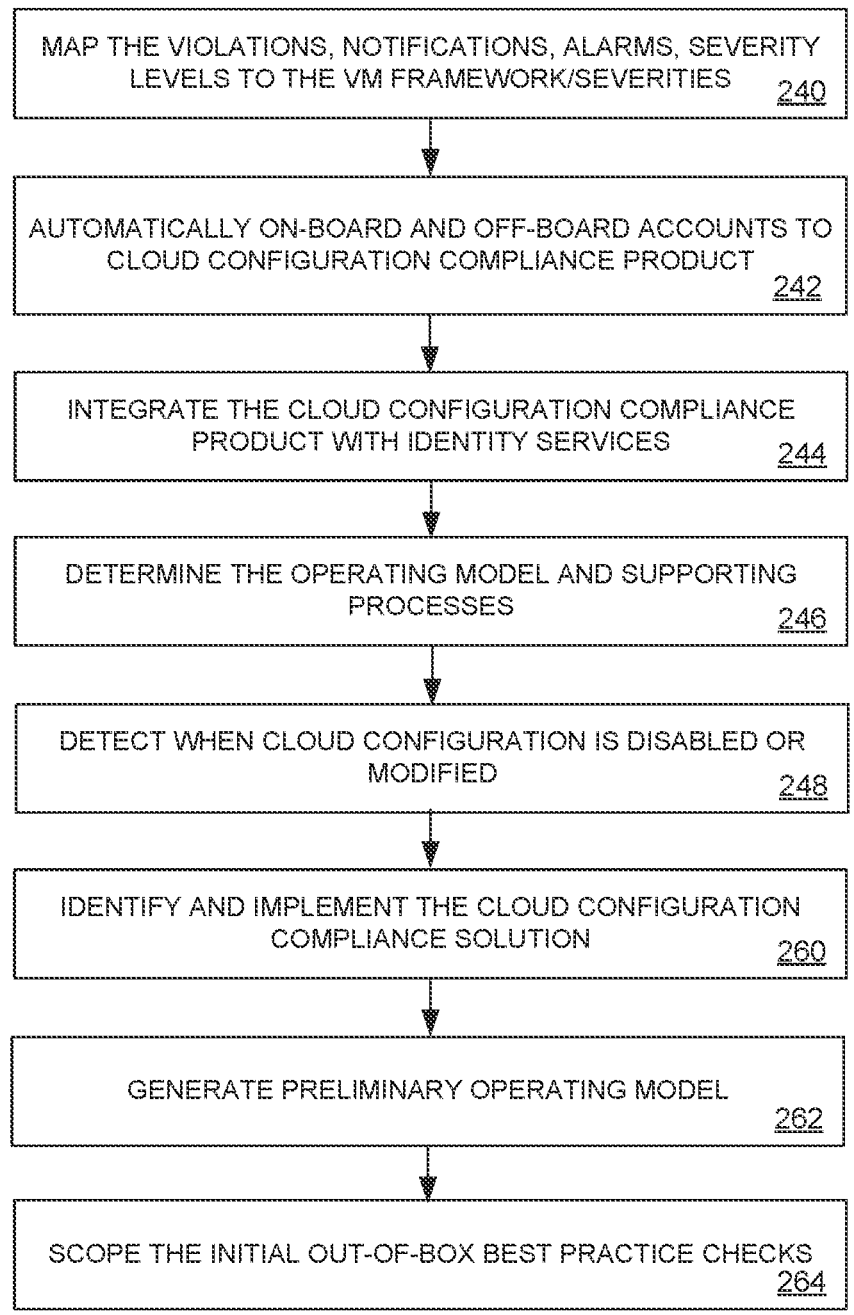
FIG. 2C is a detailed flow diagram of block for enabling control plane threat monitoring and cloud security posture management in accordance with one implementation of the present disclosure.

FIG. 2C is a detailed flow diagram of block 130 and block 140 for enabling control plane threat monitoring and cloud security posture management in accordance with one implementation of the present disclosure. As described above, the control plane threat monitoring is enabled by procuring and implementing a compliance product of the cloud configuration, which provides real-time visibility into the existing risks of the cloud configuration that are active within the environment. Further, the cloud security posture management is enabled by procuring and implementing the cloud configuration compliance product which will provide real-time visibility into existing cloud configuration risks that are active within the environment.

In the illustrated implementation of FIG. 2C, the violations, notifications, alarms, severity levels are mapped, at block 240, to a severity framework, such as a virtual machine framework. Accounts are added and removed, such as by being automatically onboarded and off-boarded, at block 242, to the cloud configuration compliance product, which is then integrated with identity services, at block 244. Next, the operating model and supporting processes are determined for compliance and operational event management, at block 246. Finally, the cloud configuration compliance is monitored, at block 248, to detect when it is disabled or modified.

In the illustrated implementation of FIG. 2C, the cloud configuration compliance solution identified and implemented, at block 260. Next, preliminary operating model and supporting processes, procedures, code, and training are generated, at block 262, to handle violations/alerts, change management, reporting, exceptions, and custom checks. Finally, the initial out-of-box best practice checks, including the center for internet security benchmarks, are scoped, at block 264.

Figure 3:
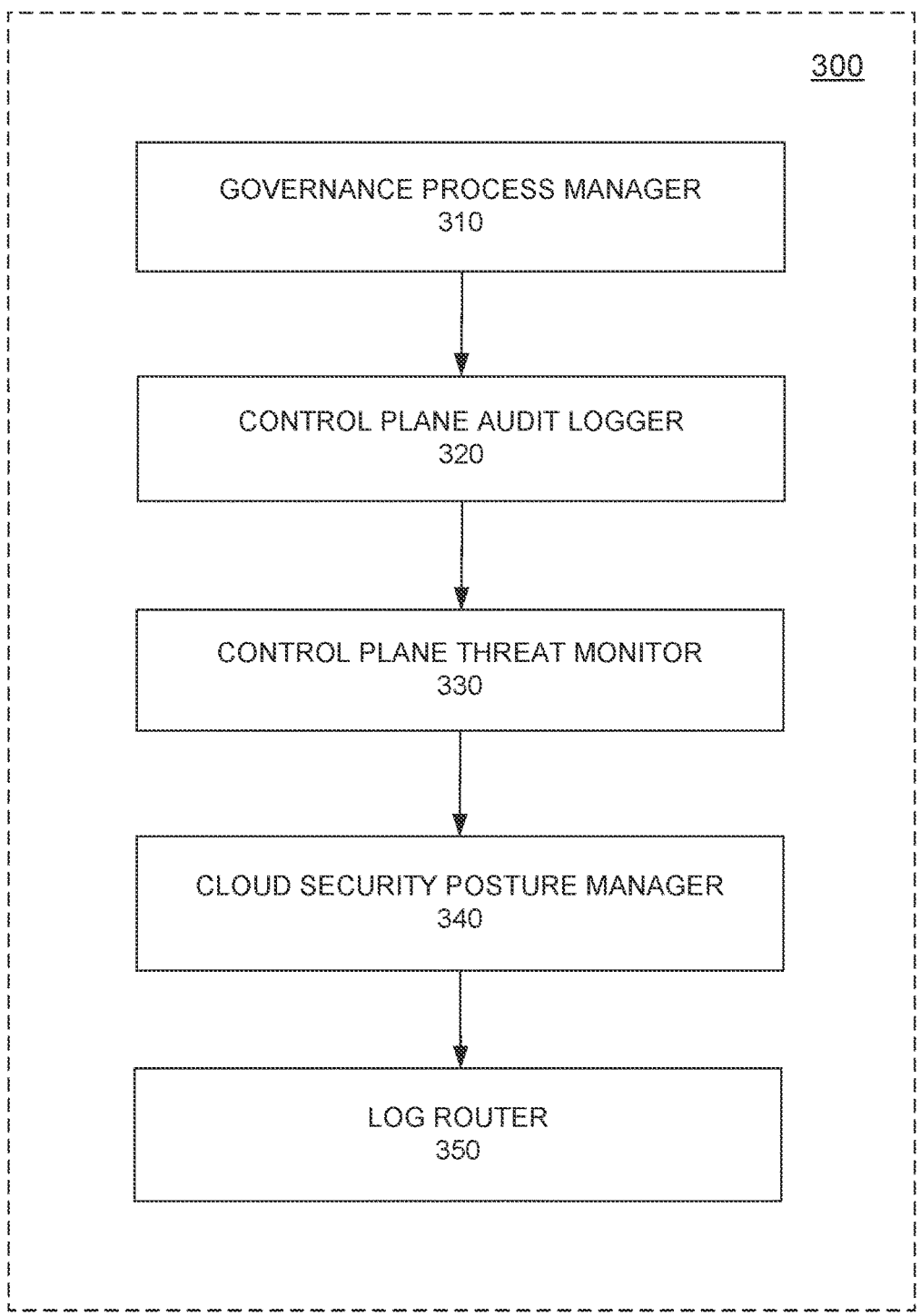
FIG. 3 is a block diagram of a system 300 for implementing configuration specifications supporting the secure use of cloud technology in accordance with one implementation of the present disclosure.

FIG. 3 is a block diagram of a system 300 for implementing configuration specifications supporting the secure use of cloud technology in accordance with one implementation of the present disclosure. In the illustrated implementation of FIG. 2, the system 300 includes a governance process manager 310, a control plane audit logger 320, a control plane threat monitor 330, a cloud security posture manager 340, and a log router 350 which routes the logs of the cloud configuration to a managed security service provider. In one implementation, the blocks 310, 320, 330, 340, and 350 of the system 300 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In one implementation, the governance process manager 310 secures the root account by establishing governance processes of a cloud configuration, which facilitates the introduction of new cloud environments that are compliant with the framework of the cloud infrastructure. In one implementation, the governance process manager 310 determines and defines the roles and responsibilities of the information security within the working group of the cloud. This is typically done for billing and forecasting costs of cloud usage and associated requirements. The manager 310 may then generate a design of the organizational structure of the cloud and asset/service tagging, as well as account instantiation processes, procedures, roles and responsibilities, code, and training for provisioning an account with the baseline configuration. For example, these may include account federation, logging, locked down root account, default identity and access management (IAM) administrator role with email distribution, and cloud configuration compliance. Next, in one implementation, the manager 310 (1) establishes a single point of entry for account creation, (2) generates training and communications plans to educate on the cloud technology and the cloud information security standard, (3) determines how current change, release, configuration, risk, incident, and service management processes are adapted to the cloud, and (4) determines product acquisition strategies. The acquisition strategies may include (1) when to select products which support multiple cloud providers versus a single cloud provider or (2) building a solution versus buying a commercial solution for a given problem.

In one implementation, the control plane audit logger 320 enables audit logging of the cloud configuration, which formalizes an approach to logging and auditing within the cloud infrastructure. The audit log is a record of events and changes, typically regarding a sequence of activities or a specific activity. In one implementation, the control plane audit logger 320 (1) generates solution architecture and supporting processes, procedures, code, and training for routing and delivering cloud logs to the MSSP, (2) determines audit and compliance logging requirements, (3) defines logging and monitoring for cloud management plane, application program interfaces (APIs), and services logging (excluding operating system and application logging), (4) generates code to auto-configure and enable immutable logging and storage within a cloud account, (5) configures cloud configuration compliance product to monitor account logging configuration, and (6) verifies, reports, and corrects an account logging configuration.

In one implementation, the control plane threat monitor 330 (1) maps the violations, notifications, alarms, severity levels to the virtual machine framework, (2) automatically onboards and off-boards accounts to the cloud configuration compliance product, (3) determines the operating model and supporting processes for compliance and operational event management, and (4) monitors the cloud configuration compliance to detect when it is disabled or modified.

In one implementation, the cloud security posture manager 340 is enabled by procuring and implementing compliance product of the cloud configuration, which provides real-time visibility into the existing risks of the cloud configuration that are active within the environment. In one implementation, the cloud security posture manager 340 (1) identifies and implements the cloud configuration compliance solution, (2) generates preliminary operating model and supporting processes, procedures, code, and training to handle violations/alerts, change management, reporting, exceptions, and custom checks, and (3) scopes the initial out-of-box best practice checks, including the center for internet security benchmarks.

Figure 4A:
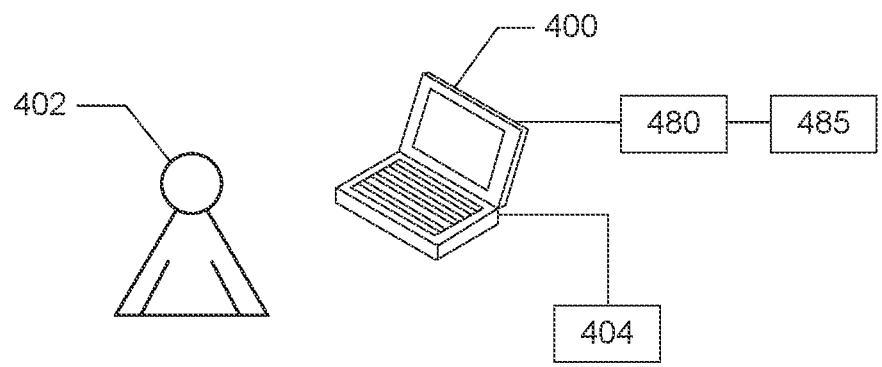
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a cloud security application 490 for implementing configuration specifications supporting the secure use of cloud technology with respect to the process 100 of FIG. 1 and the system 300 of FIG. 3.

Figure 4B:
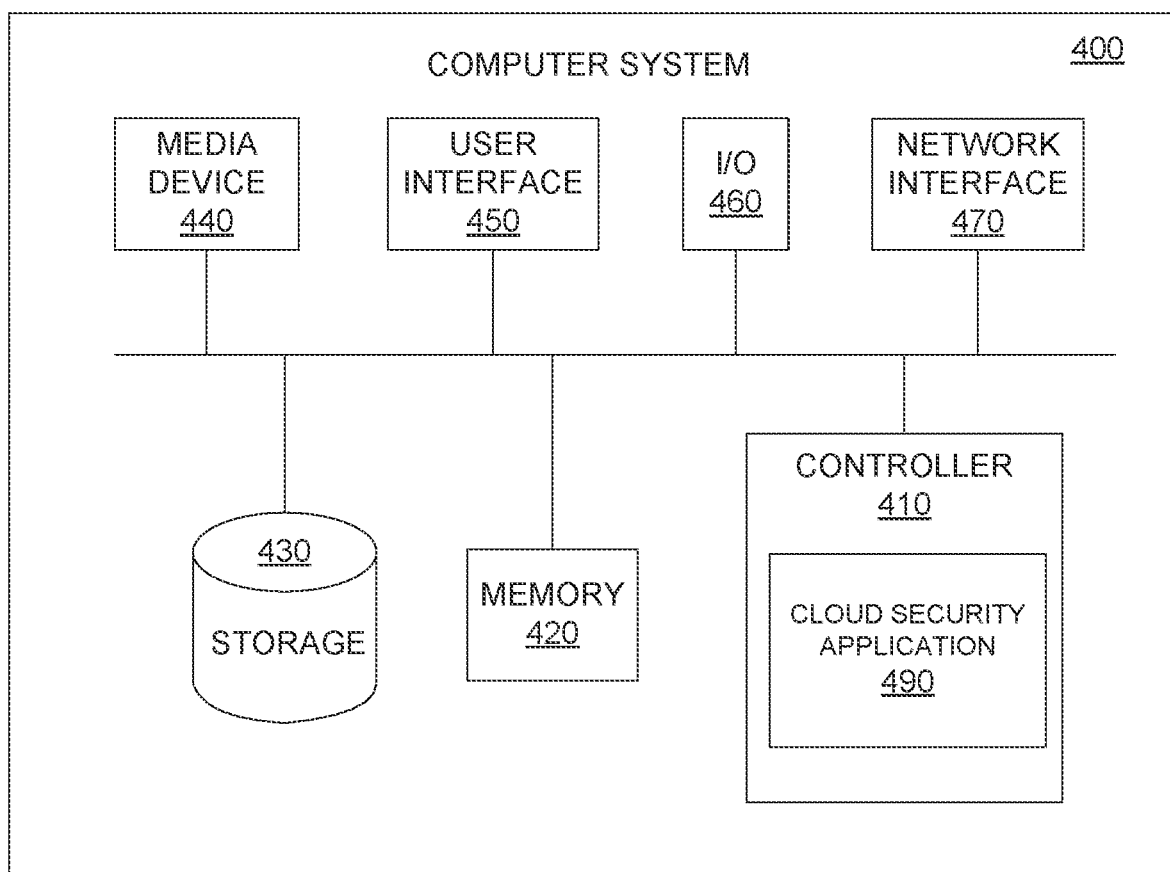
FIG. 4B is a functional block diagram illustrating the computer system hosting the cloud security application in accordance with an implementation of the present disclosure.

The computer system 400 stores and executes the cloud security application 490 of FIG. 4B. In addition, the computer system 400 may be in communication with a software program 404. Software program 404 may include the software code for the cloud security application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the cloud security application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the cloud security application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the cloud security application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the cloud security application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one particular implementation, a method for providing secure use of a cloud technology within a cloud infrastructure is disclosed. The method includes securing a root account by establishing governance processes of a cloud configuration. The method also includes enabling audit logging to generate logs of the cloud configuration. The method also includes enabling threat monitoring and cloud security posture management by procuring and implementing compliance product of the cloud configuration. The method further includes routing the logs of the cloud configuration to a managed security service provider.

In one implementation, securing the root account includes providing cloud environments that are compliant with a framework of the cloud infrastructure. In one implementation, the threat monitoring includes providing real-time visibility into existing risks of the cloud configuration that are active within the cloud environments. In one implementation, the method further includes identifying tools and techniques for remediating the existing risks associated with deployment of cloud infrastructure. In one implementation, securing the root account includes: generating an organizational structure of the cloud infrastructure; and tagging assets and services within the cloud infrastructure. In one implementation, securing the root account includes establishing a single point of entry for account creation. In one implementation, securing the root account includes identifying and determining how current change, release, configuration, risk, incident, and service management processes are adapted to the cloud technology. In one implementation, securing the root account includes determining acquisition strategies for products including when to select the products which support multiple cloud providers versus a single cloud provider, or building a solution versus buying a commercial solution. In one implementation, the audit logging includes generating solution architecture and supporting processes, procedures, and codes for routing and delivering cloud logs to a managed security service provider. In one implementation, the audit logging includes: determining audit and compliance requirements for logging; and monitoring for cloud management plane, application program interfaces, and services logging. In one implementation, the audit logging includes auto-configuring and enabling immutable logging and storage within a cloud account. In one implementation, the threat monitoring includes mapping violations, notifications, alarms, severity levels virtual machine global information security standards framework. In one implementation, the threat monitoring includes automatically onboarding and off-boarding accounts to products that are compliant to the cloud configuration. In one implementation, the threat monitoring includes: determining operating model and supporting processes for compliance to the cloud configuration; and monitoring the compliance to detect when it is disabled or modified. In one implementation, the cloud security posture management includes generating preliminary operating model and supporting processes, procedures, and codes to handle violations, alerts, change management, reporting, exceptions, and custom checks.

In another particular implementation, a system for providing secure use of a cloud technology within a cloud infrastructure includes a governance process manager, a control plane audit logger, a control plane threat monitor, a cloud security posture manager, and a log router. The governance process manager secures a root account by establishing governance processes of a cloud configuration. The control plane audit logger enables audit logging to generate logs of the cloud configuration. The control plane threat monitor enables threat monitoring. The cloud security posture manager manages cloud security posture by procuring and implementing compliance product of the cloud configuration. The log router routes the logs of the cloud configuration to a managed security service provider.

In one implementation, the governance process manager provides cloud environments that are compliant with a framework of the cloud infrastructure. In one implementation, the control plane threat monitor provides real-time visibility into existing risks of the cloud configuration that are active within the cloud environments.

In yet another particular implementation, a non-transitory computer-readable storage medium storing a computer program to provide secure use of a cloud technology within a cloud infrastructure includes executable instructions that cause a computer to: secure a root account by establishing governance processes of a cloud configuration; enable audit logging to generate logs of the cloud configuration; enable threat monitoring and cloud security posture management by procuring and implementing compliance product of the cloud configuration; and route the logs of the cloud configuration to a managed security service provider.

In one implementation, the executable instructions that cause the computer to secure the root account includes executable instructions that cause the computer to provide cloud environments that are compliant with a framework of the cloud infrastructure. In one implementation, the executable instructions that cause the computer to enable the threat monitoring comprises executable instructions that cause the computer to provide real-time visibility into existing risks of the cloud configuration that are active within the cloud environments. In one implementation, the non-transitory computer-readable storage medium further includes executable instructions that cause the computer to identify tools and techniques for remediating the existing risks associated with deployment of cloud infrastructure.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for providing secure use of a cloud technology within a cloud infrastructure, the method comprising:
   securing a root account by establishing governance processes of a cloud configuration to facilitate introduction of new cloud environments that are compliant with a framework of the cloud infrastructure;
   enabling audit logging to generate logs of the cloud configuration comprising determining audit and compliance requirements for logging, and monitoring for cloud management plane, application program interfaces, and services logging;
   enabling threat monitoring and cloud security posture management by procuring and implementing compliance product of the cloud configuration,
   wherein the threat monitoring comprises:
   mapping violations, notifications, alarms, severity levels to a virtual machine global information security standards framework;
   automatically onboarding and off-boarding accounts to products that are compliant to the cloud configuration;
   determining operating model and supporting processes for compliance to the cloud configuration;
   monitoring the compliance to detect when it is disabled or modified; and
   routing the logs of the cloud configuration to a managed security service provider.

2. The method of claim 1, wherein the threat monitoring comprises providing real-time visibility into existing risks of the cloud configuration that are active within the cloud environments.

3. The method of claim 2, further comprising identifying tools and techniques for remediating the existing risks associated with deployment of cloud infrastructure.

4. The method of claim 1, wherein securing the root account comprises:
   generating an organizational structure of the cloud infrastructure; and
   tagging assets and services within the cloud infrastructure.

5. The method of claim 1, wherein securing the root account comprises establishing a single point of entry for account creation.

6. The method of claim 1, wherein securing the root account comprises identifying and determining how current change, release, configuration, risk, incident, and service management processes are adapted to the cloud technology.

7. The method of claim 1, wherein securing the root account comprises determining acquisition strategies for products including when to select the products which support multiple cloud providers versus a single cloud provider, or building a solution versus buying a commercial solution.

8. The method of claim 1, wherein the audit logging comprises generating solution architecture and supporting processes, procedures, and codes for routing and delivering cloud logs to a managed security service provider.

9. The method of claim 1, wherein the audit logging comprises auto-configuring and enabling immutable logging and storage within a cloud account.

10. The method of claim 1, wherein the cloud security posture management comprises generating preliminary operating model and supporting processes, procedures, and codes to handle violations, alerts, change management, reporting, exceptions, and custom checks.

11. A system comprising:
one or more display devices,
one or more processors, and
one or more memory devices, the one or more memory devices storing computer-executable instructions which, when executed by the one or more processors, cause the one or more processors to:
provide cloud environments that are compliant with a framework of a cloud infrastructure based on secure use of a cloud technology within the cloud infrastructure;
secure a root account by establishing governance processes of a cloud configuration to facilitate introduction of new cloud environments that are compliant with a framework of the cloud infrastructure;
enable audit logging to generate logs of the cloud configuration comprising determining audit and compliance requirements for logging, and monitoring for cloud management plane, application program interfaces, and services logging;
enable threat monitoring to provide real-time visibility into existing risks of the cloud configuration that are active within the cloud environments,
wherein the threat monitoring comprises:
mapping violations, notifications, alarms, severity levels to a virtual machine global information security standards framework;
automatically onboarding and off-boarding accounts to products that are compliant to the cloud configuration;
determining operating model and supporting processes for compliance to the cloud configuration;
monitoring the compliance to detect when it is disabled or modified;
manage cloud security posture by procuring and implementing compliance product of the cloud configuration; and
route the logs of the cloud configuration to a managed security service provider.

12. A non-transitory computer-readable storage medium storing a computer program to provide secure use of a cloud technology within a cloud infrastructure, the computer program comprising executable instructions that cause a computer to:
secure a root account by establishing governance processes of a cloud configuration to facilitate introduction of new cloud environments that are compliant with a framework of the cloud infrastructure;
enable audit logging to generate logs of the cloud configuration comprising determining audit and compliance requirements for logging, and monitoring for cloud management plane, application program interfaces, and services logging;
enable threat monitoring and cloud security posture management by procuring and implementing compliance product of the cloud configuration,
wherein the threat monitoring comprises:
mapping violations, notifications, alarms, severity levels to a virtual machine global information security standards framework;
automatically onboarding and off-boarding accounts to products that are compliant to the cloud configuration;
determining operating model and supporting processes for compliance to the cloud configuration;
monitoring the compliance to detect when it is disabled or modified; and
route the logs of the cloud configuration to a managed security service provider.

13. The non-transitory computer-readable storage medium of claim 12, wherein the executable instructions that cause the computer to enable the threat monitoring comprises executable instructions that cause the computer to provide real-time visibility into existing risks of the cloud configuration that are active within the cloud environments.

14. The non-transitory computer-readable storage medium of claim 13, further comprising executable instructions that cause the computer to identify tools and techniques for remediating the existing risks associated with deployment of cloud infrastructure.

* * * * *